United States Patent
Banerjee et al.

(10) Patent No.: US 10,296,786 B2
(45) Date of Patent: May 21, 2019

(54) DETECTING HAND-EYE COORDINATION IN REAL TIME BY COMBINING CAMERA EYE TRACKING AND WEARABLE SENSING

(71) Applicant: International Business Machines Corporation, Armonk, NY (US)

(72) Inventors: Dipyaman Banerjee, Bangalore (IN); Kuntal Dey, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 11 days.

(21) Appl. No.: 15/433,282

(22) Filed: Feb. 15, 2017

(65) Prior Publication Data
US 2018/0232890 A1    Aug. 16, 2018

(51) Int. Cl.
*G06K 9/00* (2006.01)
*G06K 9/62* (2006.01)
(Continued)

(52) U.S. Cl.
CPC ......... *G06K 9/00355* (2013.01); *G06F 3/033* (2013.01); *G06K 9/00604* (2013.01);
(Continued)

(58) Field of Classification Search
CPC  G06T 7/248; G06T 7/292; G06T 7/74; G06T 2207/10016; G06T 2207/30196;
(Continued)

(56) References Cited

U.S. PATENT DOCUMENTS

| 4,325,697 A | 4/1982 | Regan et al. |
| 8,574,101 B2 | 11/2013 | Wheelbarger et al. |

(Continued)

FOREIGN PATENT DOCUMENTS

| WO | 2011006091 A1 | 1/2011 |
| WO | 2014164453 A1 | 10/2014 |

(Continued)

OTHER PUBLICATIONS

Kuperstein, M., Neural model of adaptive hand-eye coordination for single postures. Science, Mar. 1988.
(Continued)

*Primary Examiner* — Brenda C Bernardi
(74) *Attorney, Agent, or Firm* — Ryan, Mason & Lewis, LLP

(57) ABSTRACT

Methods, systems, and computer program products for detecting hand-eye coordination in real time by combining camera eye tracking and wearable sensing are provided herein. A computer-implemented method includes determining an eye gaze path of an individual during a given period of time by measuring (i) any eye movements made by the individual during the given period of time and (ii) any head movements made by the individual during the given period of time; measuring any hand movements made by the individual during the given period of time; performing a spatio-temporal analysis of the determined eye gaze path and the measured hand movements to compute a hand-eye coordination value attributable to the individual; and outputting the computed hand-eye coordination value to at least one user.

18 Claims, 7 Drawing Sheets

(51) Int. Cl.
*G06T 7/73* (2017.01)
*G06T 7/246* (2017.01)
*G06T 7/292* (2017.01)
*G06F 3/033* (2013.01)
*G06T 7/00* (2017.01)

(52) U.S. Cl.
CPC .. *G06T 7/0016* (2013.01); *G06T 2207/30196* (2013.01); *G06T 2207/30241* (2013.01)

(58) Field of Classification Search
CPC ...... G06T 2207/30241; G06K 9/00355; G06K 9/0061; G06K 9/6215
See application file for complete search history.

(56) References Cited

U.S. PATENT DOCUMENTS

| | | | |
|---|---|---|---|
| 2008/0312010 A1* | 12/2008 | Marty | A63B 24/0003 473/447 |
| 2009/0036801 A1 | 2/2009 | Chuang et al. | |
| 2010/0033333 A1* | 2/2010 | Victor | A61B 3/113 340/576 |
| 2010/0216104 A1 | 8/2010 | Reichow et al. | |
| 2014/0341473 A1* | 11/2014 | Lee | G06K 9/00268 382/195 |
| 2015/0062534 A1* | 3/2015 | Massengill | A61B 5/4064 351/209 |
| 2015/0064643 A1 | 3/2015 | Chun et al. | |
| 2015/0160726 A1* | 6/2015 | Sullivan | G06F 3/013 345/156 |
| 2016/0203362 A1* | 7/2016 | Huang | G06F 3/017 726/19 |
| 2017/0092007 A1* | 3/2017 | Goldberg | G02B 27/0172 |
| 2017/0258397 A1* | 9/2017 | Ghajar | A61B 5/486 |
| 2017/0344220 A1* | 11/2017 | Cook | G06T 13/40 |
| 2017/0346817 A1* | 11/2017 | Gordon | G02B 27/0172 |
| 2018/0025245 A1* | 1/2018 | Sezgin | G06F 3/013 382/103 |
| 2018/0032139 A1* | 2/2018 | Whiteford | G11B 27/00 |
| 2018/0070816 A1* | 3/2018 | Byrns | A61B 3/113 |
| 2018/0079427 A1* | 3/2018 | Herz | B60W 50/10 |

FOREIGN PATENT DOCUMENTS

| | | |
|---|---|---|
| WO | 2015031049 A1 | 3/2015 |
| WO | 2016027215 A1 | 2/2016 |

OTHER PUBLICATIONS

Hager et al., Robot hand-eye coordination based on stereo vision. IEEE control systems 15(1)30 — 39. Mar. 1995.
Specked, G., Hand Eye Coordination. Massachusetts Institute of Technology Artificial Intelligence Laborator, Jul. 1976.
Hollinghurst et al., Uncalibrated stereo hand-eye coordination. Image and Vision Computing, vol. 12, Issue 3, Apr. 1994.
Hong et al., Experiments in hand-eye coordination using active vision. Proceedings of the Fourth International Symposium on Experimental Robotics, ISER'95, Stanford, California, Jun. 30-Jul. 2, 1995.
Ballard et al., Hand-Eye Coordination during Sequential Tasks. Philos Trans R Soc Lond B Biol Sci. Sep. 29, 1992.

* cited by examiner

US 10,296,786 B2

DETECTING HAND-EYE COORDINATION IN REAL TIME BY COMBINING CAMERA EYE TRACKING AND WEARABLE SENSING

FIELD

The present application generally relates to information technology, and, more particularly, to biometrics.

BACKGROUND

Hand-eye calibration is an active field of research in robotics, but existing approaches in this field generally do not focus on measuring hand-eye coordination for humans. Further, any efforts by existing approaches to detect hand-eye coordination fail to directly correlate eye and head movement with hand movement.

SUMMARY

In one embodiment of the present invention, techniques for detecting hand-eye coordination in real time by combining camera eye tracking and wearable sensing are provided. An exemplary computer-implemented method can include determining an eye gaze path of an individual during a given period of time by measuring, via captured video data, (i) any eye movements made by the individual during the given period of time and (ii) any head movements made by the individual during the given period of time. Such a method can also include measuring, via data derived from one or more wearable sensors, any hand movements made by the individual during the given period of time, and performing a spatio-temporal analysis of the determined eye gaze path and the measured hand movements to compute a hand-eye coordination value attributable to the individual. In such a method, the spatio-temporal analysis comprises: comparing (i) temporal values associated with movement along the determined eye gaze path and (ii) temporal values associated with the measured hand movement; and comparing (i) one or more spatial trajectories associated with the determined eye gaze path on a given projected plane and (ii) one or more spatial trajectories associated with the measured hand movements on the given projected plane. Further, such a method can additionally include outputting the computed hand-eye coordination value to at least one user.

In another embodiment of the invention, an exemplary computer-implemented method can additionally include steps of providing, to a user, a task which requires hand-eye coordination by the user, commencing the task at a first time value, and ending the task at the second time value.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
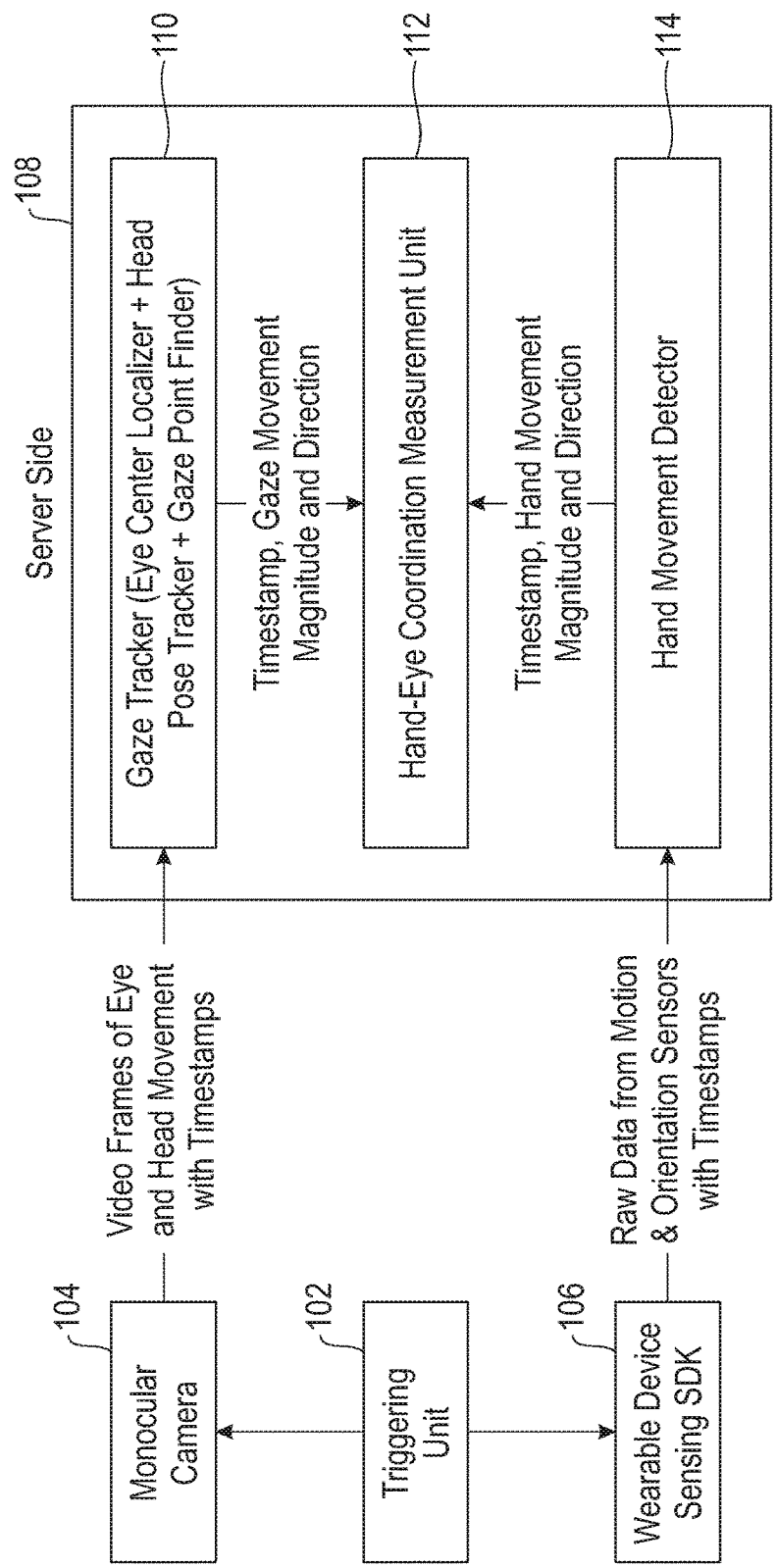
FIG. 1 is a diagram illustrating system architecture, according to an exemplary embodiment of the invention.

As described herein, an embodiment of the present invention includes detecting hand-eye coordination in real time by combining camera eye tracking and wearable sensing. At least one embodiment of the invention can include measuring hand-eye coordination of an individual (a human or certain animals) in real time by spatio-temporally comparing a determined eye gaze scan path and one or more determined hand movements. In such an embodiment, eye and head movements made by the individual can be tracked by a video camera to determine gaze points and create the scan path. Such a video camera can include, for example, a monocular camera, a stereo camera, and/or multiple individual cameras.

Additionally, hand movements made by the individual can be tracked by one or more sensors (such as motion sensors and/or orientation sensors) resident in one or more wearable devices (such as smart watches, for example). Accordingly, one or more embodiments of the invention can include comparing the timing of the hand movements with respect to the determined eye gaze scan path, and comparing the spatial trajectory of the eye gaze points (within the scan path) and the spatial trajectory of the hand movements, on a given projected plane, to determine hand-eye coordination. Comparing spatial trajectories on a given projected plan can provide a sense of, temporally, how soon the hand follows the eye. Additionally, in one or more embodiments of the invention, via a spatio-temporal domain, a hand-eye coordination profile of a given individual can be built. For example, the plane can be given or defined as a plane of interest (such as a focal plane, optical projection plane, etc.) in the three-dimensional (3D) space by keeping one dimension as a constant and varying the other two dimensions. The mapping can be carried out, for example, by trigonometric (geometrical) projection techniques.

As used herein, eye tracking refers to tracking the eye center, independent of tracking where the individual is looking. Separately, eye gaze tracking (or, simply gaze tracking) refers to determining where an individual is looking, which can be determined by tracking the head pose(s) of the individual, tracking the eye movement of the individual, and combining the two data sets to obtain an eye gaze vector. Subsequently, such a vector can be intersected with the plane in front of the camera (that is, a physical plane or a hypothetical plane of interest that has been defined, such as a focal plane, an optical projection plane, etc.) in order to determine a gaze path attributable to the individual.

By way merely of illustration, one or more embodiments of the invention can be implemented within contexts such as sports (tennis, cricket, shooting, etc.), motor vehicle operation assessment, video games, as well as intricate tasks such as surgery, welding, etc. Additionally, one or more embodiments of the invention can also be implemented within various healthcare contexts, such as in connection with attempts to accurately diagnose hand-eye coordination problems due to aging or diseases such as Parkinson's disease, Balint's syndrome, oculomotor apraxia, optic ataxia, etc.

Also, at least one embodiment of the invention includes utilization and/or implementation of technical components and capabilities that include motion sensors on one or more wearable devices (such as an accelerometer or gyroscope), direction sensors on one or more wearable devices (such as magnetometer), and one or more video cameras to track eye and head movement.

FIG. 1 is a diagram illustrating system architecture, according to an embodiment of the invention. By way of illustration, FIG. 1 depicts a triggering unit 102, a camera 104, a wearable device sensing software development kit (SDK) 106, and a server side component 108 that includes a gaze tracker 110, a hand movement detector 114, and a hand-eye coordination measurement unit 112. The triggering unit 102 triggers the camera 104 to track eye and head movement(s) of an individual, and also triggers the wearable device 106 to collect motion and direction sensor data attributed to the individual. The camera 104 then provides video frames of eye and head movement with timestamps to the gaze tracker 110 of the server side component 108. Similarly, the wearable device 106 provides raw data from the motion and orientation sensors, with timestamps, to the hand movement detector 114 of the server side component 108.

Additionally, the gaze tracker 110, which includes an eye center localizer, a head pose tracker, and a gaze point finder, uses the data provided by the camera 104 to determine the eye center of the individual using any eye center detection technology (such as facial landmarks based detection). Subsequently, the gaze tracker superimposes head pose data and the determined eye center point to find an initial gaze point. Additional gaze points can be detected in a similar manner and/or can be tracked using a tracking algorithm such as an optical flow (and periodically re-detected). The gaze tracker 108 ultimately provides gaze movement magnitude and direction data, in conjunction with timestamps, to the hand-eye coordination measurement unit 112.

The hand movement detector 114 uses time domain and frequency domain features from motion sensor and orientation sensor signals to track hand movements. In one or more embodiments of the invention, supervised or unsupervised learning algorithms can use such feature values to track hand movements. Additionally, one initial point of hand-position calibration can be used as a reference point. To perform the geometric and/or trigonometric functions, the camera needs a reference point (which can also be thought of as an "origin" in a graph, or an anchor point). The hand movement detector 114 ultimately provides hand movement magnitude and direction data, in conjunction with timestamps, to the hand-eye coordination measurement unit 112.

The hand-eye coordination measurement unit 114 analyzes and compares timing and spatial trajectories of the eye-head (gaze) movements and the hand movements, as provided by the gaze tracker 108 and the hand movement detector 114, respectively, to measure hand-eye coordination of the given individual, as further described below.

By way of illustration, consider an example scenario wherein a task is given to the user which requires hand-eye coordination. A sample task can include, for example, having the user touch a moving image on a mobile device screen. Accordingly, at least one embodiment of the invention can include starting the task at time $t_0$, and simultaneously starting the tracking of eye and head movement (gaze movement) via a video camera, as well as collecting data from motion and orientation sensors (accelerometer, gyroscope, magnetometer, etc.) present on the user's wearable device (such as a smart watch).

Such an embodiment can include analyzing the video frames obtained from the camera to determine the time $t_1$, after $t_0$, when the eye and head of the user starts moving. Additionally, such an embodiment can include determining the gaze point sequence $(x_i, y_i)$ and the corresponding timestamps $(t_i)$ by combining the eye center and head pose information. Accordingly, as detailed herein, an eye gaze point estimation is a combination of the head angle and the position of the eye center. Combining these two values enables determination of the point that that eye is gazing towards.

Further, such an embodiment can also include analyzing the wearable sensor data to determine the time $t_2$, after $t_1$, when the hand movement starts. Additionally, such an embodiment can include determining the magnitude of such hand movement via motion sensors, and the direction of such hand movement using orientation sensors, to obtain successive positions of the hand $(x'_i, y'_i)$ and the corresponding timestamps $(t_i)$.

In one or more embodiments of the invention, the above-noted steps can be repeated multiple times over the course of a given temporal period. Additionally, at least one embodiment of the invention includes analyzing and comparing the timings and spatial coordinates of the gaze movement of the user with the hand movements of the user, collected using the above-noted steps. Specifically, such an embodiment can include measuring hand fixation zones and eye fixation zones at similar timestamps deviations between the hand movement trajectory and the gaze saccades, with respect to a set of one or more reference points; and any delay between hand movements and eye movements. As used herein, a fixation point refers to a point where the eye gaze rests for more than a defined threshold duration of time. Similarly, in at least one embodiment of the invention, a hand fixation point refers to a point where the hand rests for longer than a pre-determined amount of time. A fixation zone can be thought of as a spatial zone, formed as a cluster of fixation points that are spatially proximate, similar to hot areas on a heat map.

Figure 2A:
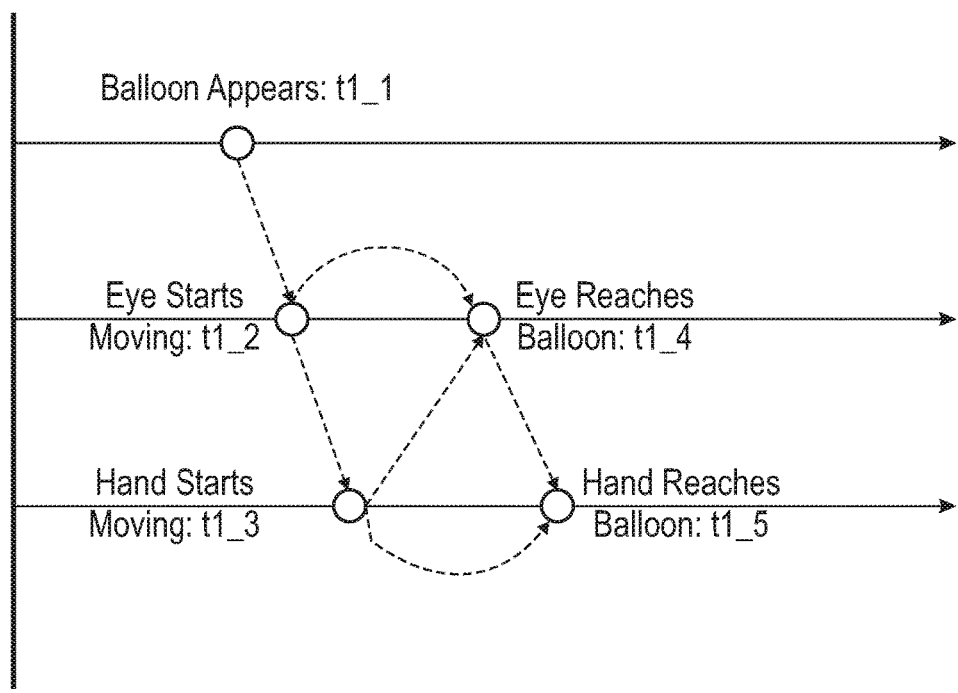
FIG. 2A and FIG. 2B are diagrams illustrating aspects of an exemplary embodiment of the invention.
Figure 2B:
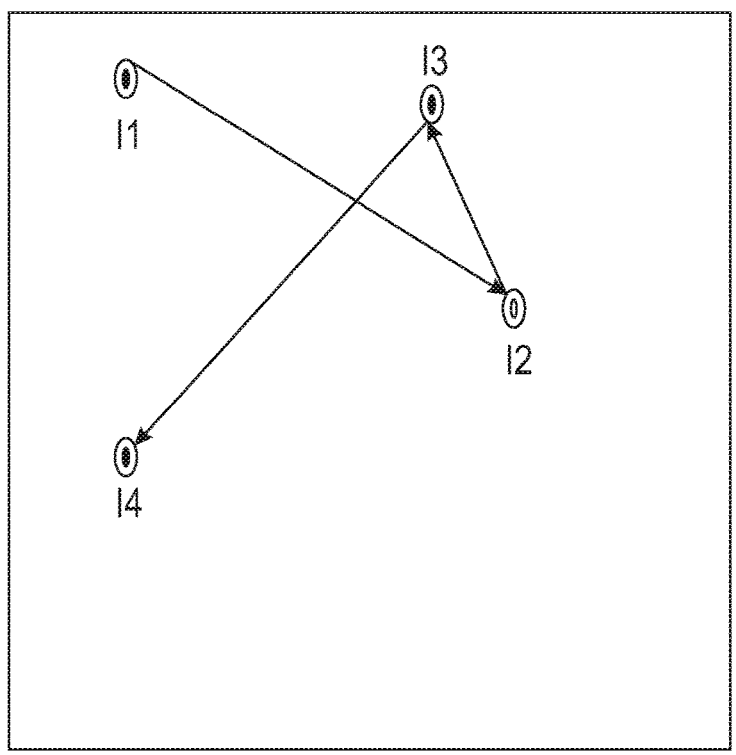

FIG. 2A and FIG. 2B are diagrams illustrating aspects of an exemplary embodiment of the invention. By way of illustration, FIG. 2A depicts a graph 202 of temporal measurements for a given location l1 (x1, y1). By way of illustrative context for the example depicted in FIG. 2A and FIG. 2B, assume a scenario wherein a user is playing a video game on his or her mobile device, wherein the objective of the game is to touch the screen of the device as the user sees a balloon flying on the screen, and the user accumulates points for each balloon he or she successfully touches. Accordingly, at least one embodiment of the invention can include measuring the user's hand-eye coordination by tracking the user's hand movements via wearable sensors on his or her smart watch, and tracking the user's eye movements via a camera (such as a monocular front camera) of the user's mobile device.

Continuing with the example depicted in FIG. 2A, for each location li ($x_i$, $y_i$), such an embodiment of the invention can record the following times: (i) ti_1, the time when the object (balloon) first appeared; (ii) ti_2, the time when the user's eye started moving; (iii) ti_3, the time when the user's hand started moving; (iv) ti_4, the time when the user's eye reached the target object (balloon); and (v) ti_5, the time when the user's hand reached the target object (balloon). Additionally, such an embodiment can include computing time intervals that include the following: (i) (t1_2–t1_1), the lag of the start of eye movement; (ii) (t1_3–t1_2), the hand movement delay after the eye starts tracking the object; (iii) (t1_4–t1_2), the total eye saccade time; and (iv) (t1_5–t1_3), the total time taken by the hand to reach target position. Further, the computed intervals can be stored for every location-to-location movement (in this example, from the starting point to l1).

Additionally, FIG. 2B depicts a spatial analysis graph 204 corresponding to the graph 202 of temporal measurements for a series of locations li (wherein i ranges from 1 to n). As such, in one or more embodiments of the invention, a spatial analysis is conducted on the series of locations li (wherein i ranges from 1 to n). For instance, if location l1 has coordinates (x1, y1), then the eye gaze reaching (x1, y1) and the hand gesture reaching (x1, y1) are not guaranteed. The eye, for example, might reach (x1_1, y1_1), and the hand, for example, might reach (x1_2, y1_2). Thus, deviations such as d[(x1, y1), (x1_1,y1_1)], d[(x1,y1), (x1_2,y1_2), and d[(x1_1,y1_1), (x1_2,y1_2)], etc. can be noted, wherein d is a function such as a distance function. Here, "d" can refer to the Euclidean distance between the points. The mutual distances of the target point, the eye gaze point and the point where the hand is, at a given point in time, can be used to compute and/or report the hand-eye coordination.

Accordingly, in one or more embodiments of the invention, a triplet is generated for each location li, wherein the triplet includes a timestamp t, a final location for the eye, and a final location for the hand, all of which identifies one data point. Each such triplet can be expanded into the internal temporal and spatial points. Additionally, a statistical summary for the series of locations li can be generated for times ti (ti, in the above example, will arise from the set of 5 ti elements), and each such point can be expanded for viewing via a detailed analysis and/or report. The statistical summary for the series of spatio-temporal point triplets can capture, at different instants, the level of deviation between the hand and the eye (or vice versa) in the overall series (mean, standard deviation, etc.), and (optionally) the quantity of such deviations with respect to one or more desired reference points. Further, the above measurements can be aggregated over multiple repeated instances or trials.

Figure 3:
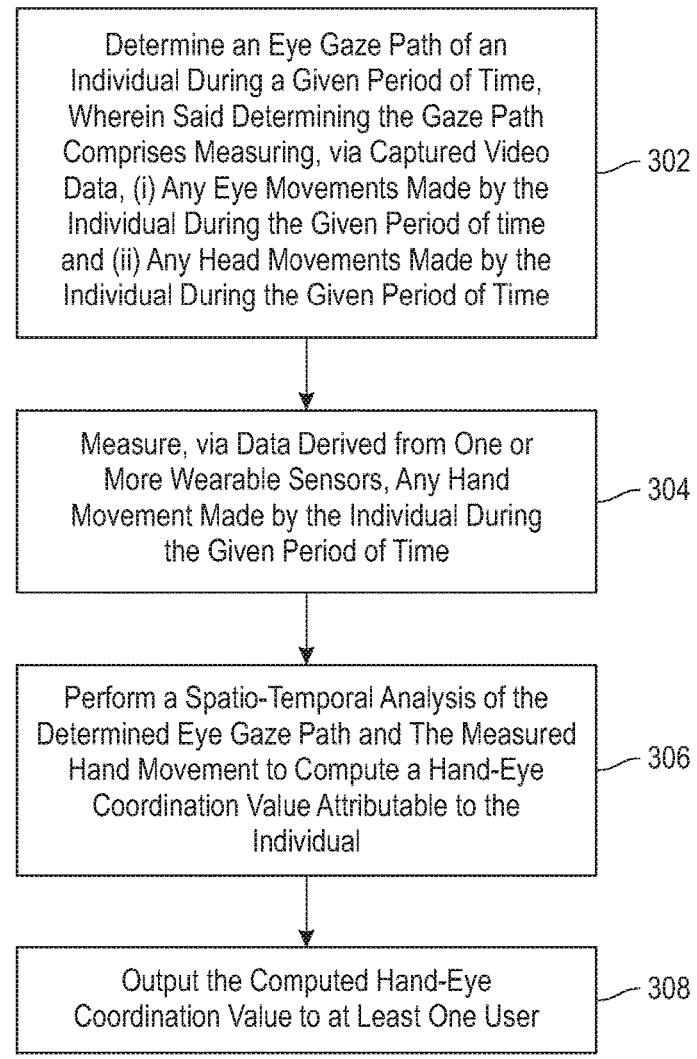
FIG. 3 is a flow diagram illustrating techniques according to an embodiment of the invention.

FIG. 3 is a flow diagram illustrating techniques according to an embodiment of the present invention. Step 302 includes determining an eye gaze path of an individual during a given period of time, wherein said determining the gaze path comprises measuring, via captured video data, (i) any eye movements made by the individual during the given period of time and (ii) any head movements made by the individual during the given period of time. In at least one embodiment of the invention, the captured video data can include video data captured by at least one monocular video camera.

Determining the eye gaze path can include determining one or more time-stamped gaze patterns of the individual during the given period of time. Additionally, in one or more embodiments of the invention, determining the eye gaze path can include determining multiple gaze points during the given period of time, and creating the eye gaze path based on the multiple gaze points.

Step 304 includes measuring, via data derived from one or more wearable sensors, any hand movements made by the individual during the given period of time. The data derived from one or more wearable sensors can include motion data and/or orientation data. Also, the one or more wearable sensors can include an accelerometer, a gyroscope, and/or a magnetometer. Further, the one or more wearable sensors can include one or more sensors resident on a smart watch worn by the individual.

Step 306 includes performing a spatio-temporal analysis of the determined eye gaze path and the measured hand movements to compute a hand-eye coordination value attributable to the individual. As detailed herein, the spatio-temporal analysis can include comparing temporal values associated with movement along the determined eye gaze path and temporal values associated with the measured hand movement, and comparing (i) one or more spatial trajectories associated with the determined eye gaze path on a given projected plane and (ii) one or more spatial trajectories associated with the measured hand movements on the given projected plane. Step 308 includes outputting the computed hand-eye coordination value to at least one user.

Comparing temporal values can include measuring a delay between one or more of the measured hand movements and one or more movements along the determined eye gaze path. Also, comparing spatial trajectories can include measuring one or more deviations, with respect to a set of one or more reference points, between one or more spatial trajectories associated with the measured hand movements on the given projected plane and gaze saccades within the determined eye gaze path. Additionally, in one or more embodiments of the invention, the spatio-temporal analysis can include measuring one or more hand fixation zones and one or more eye fixation zones at one or more related timestamps.

Also, an additional embodiment of the invention includes providing, to a user, a task which requires hand-eye coordination by the user, and commencing the task at a first time value and ending the task at a second time value. Such an embodiment also includes determining an eye gaze path of the user during a temporal period that includes the first time value and the second time value, wherein said determining the gaze path comprises measuring, via captured video data, (i) any eye movements made by the user during the temporal period and (ii) any head movements made by the user during the temporal period. Additionally, such an embodiment can include measuring, via data derived from one or more wearable sensors, any hand movements made by the user during the temporal period, performing a spatio-temporal analysis of the determined eye gaze path and the measured hand movements to compute a hand-eye coordination value for the user, with respect to the task, and outputting the computed hand-eye coordination value to the user. As noted herein, the spatio-temporal analysis can include comparing temporal values associated with movement along the determined eye gaze path and temporal values associated with the measured hand movement, and comparing one or more spatial trajectories associated with the determined eye gaze path on a given projected plane and one or more spatial trajectories associated with the measured hand movements on the given projected plane.

At least one embodiment of the invention (such as the techniques depicted in FIG. 3, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives eye movement, head movement, and hand movement data sent from one or more data sources to the transmission server. The server can process the information, for example, based upon user-provided user preference information that is stored in memory on the server. Subsequently, an alert is generated containing the determined hand-eye coordination measurement information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
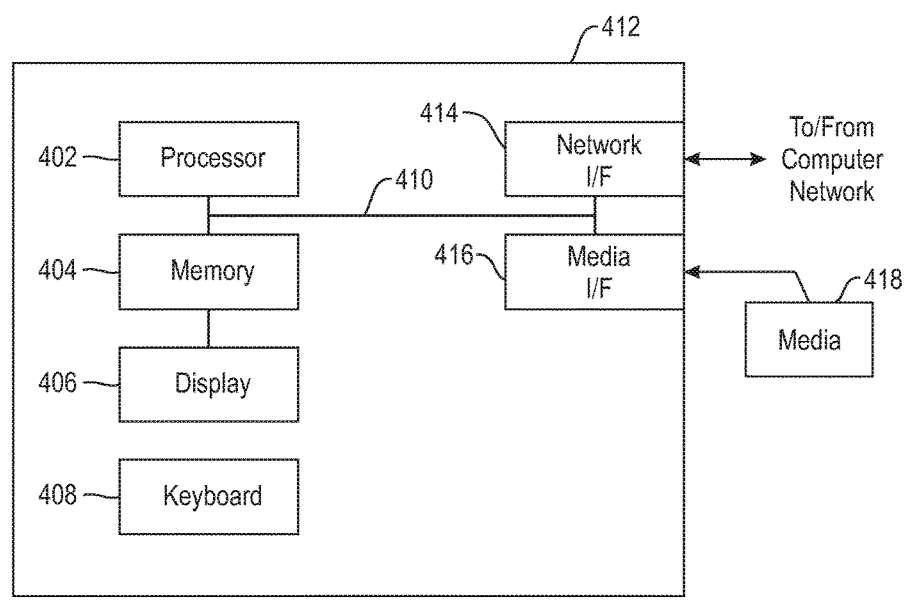
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media)

having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402.

Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
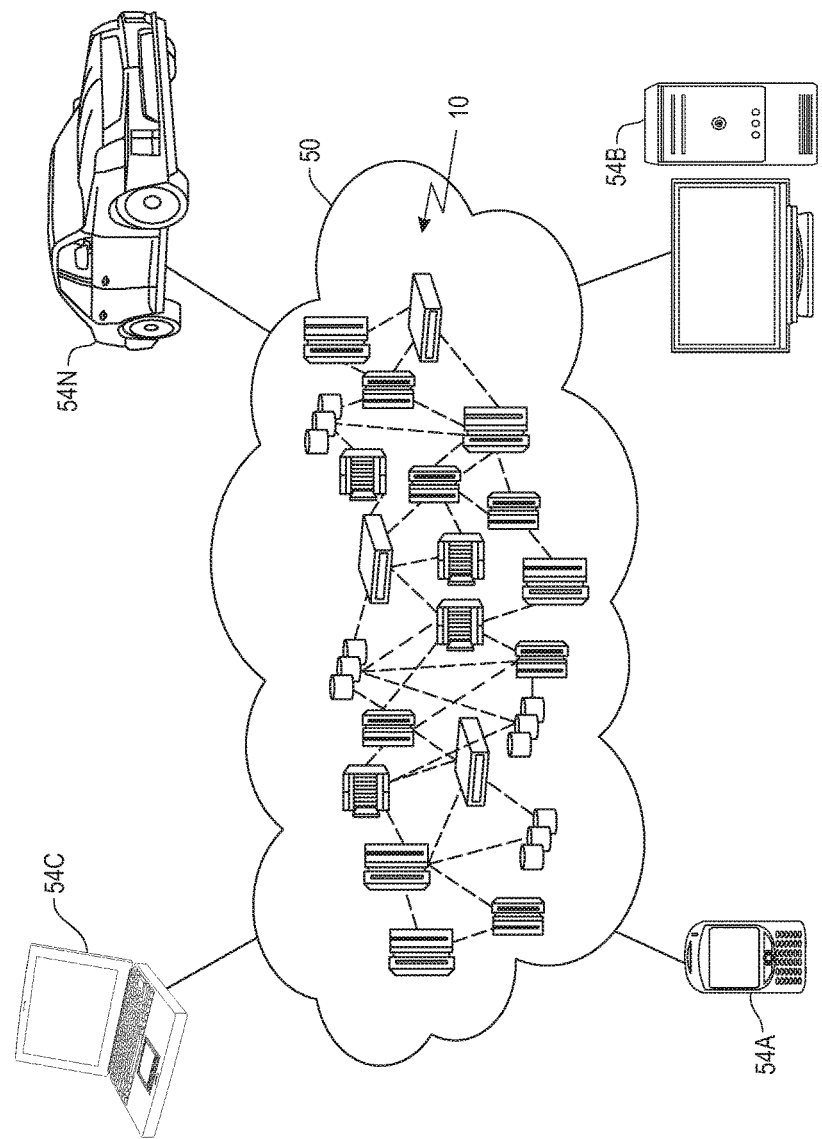
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
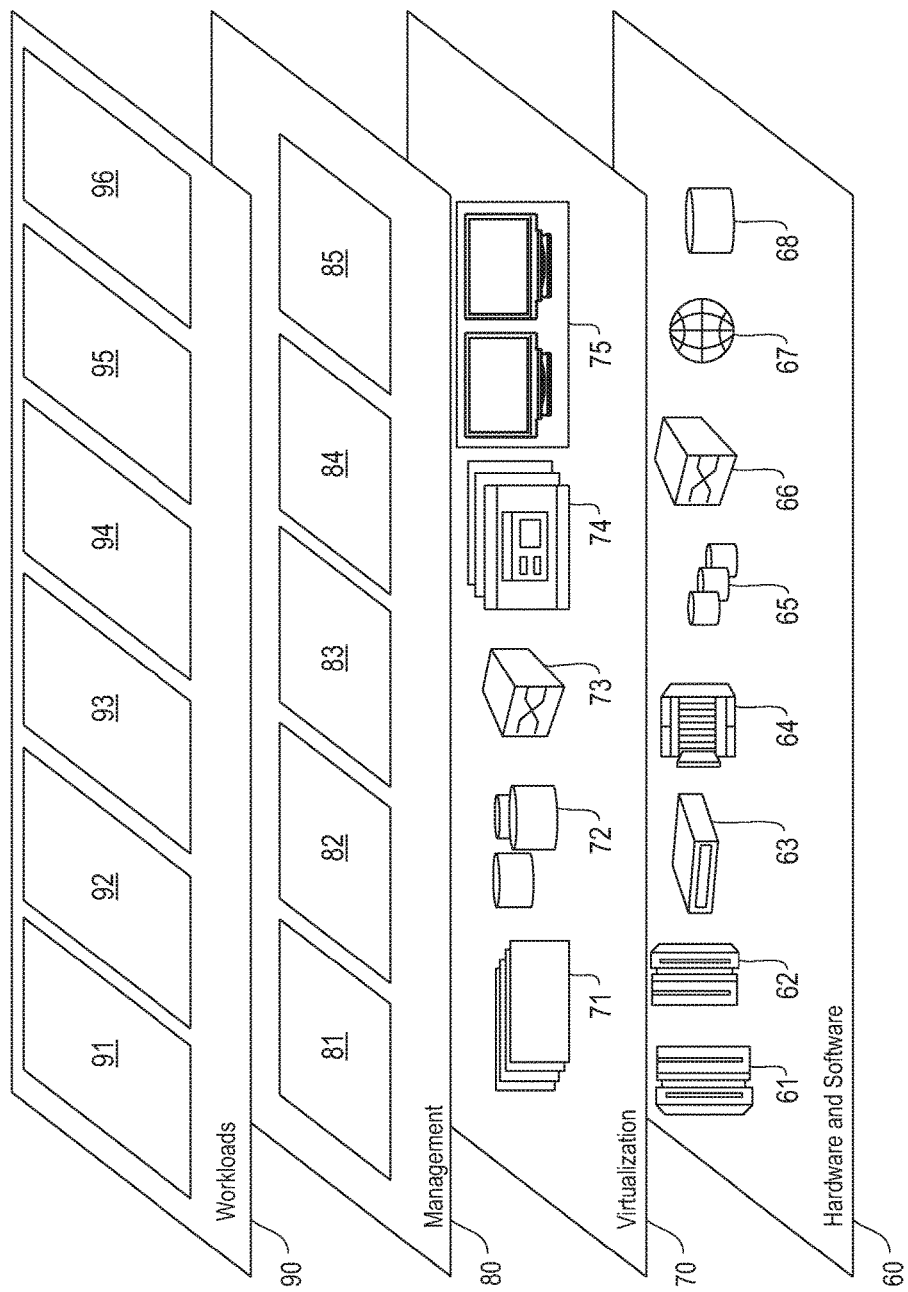
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and real-time hand-eye coordination detection 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, comparing the spatial trajectory of eye gaze points with hand movements, on a given projected plane, to determine hand-eye coordination.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining an eye gaze path of an individual during a given period of time, wherein said determining the gaze path comprises measuring, via captured video data, (i) any eye movements made by the individual during the given period of time and (ii) any head movements made by the individual during the given period of time;
   measuring, via data derived from one or more wearable sensors, any hand movements made by the individual during the given period of time;
   performing a spatio-temporal analysis of the determined eye gaze path and the measured hand movements to compute a hand-eye coordination value attributable to the individual, wherein the spatio-temporal analysis comprises:
      comparing (i) temporal values associated with movement along the determined eye gaze path and (ii) temporal values associated with the measured hand movement;
      defining a given projected plane as an optical projection plane in the three-dimensional space, wherein said defining comprises maintaining one dimension as a constant and varying the other two dimensions; and
      comparing (i) one or more spatial trajectories associated with the determined eye gaze path on the given projected plane and (ii) one or more spatial trajectories associated with the measured hand movements on the given projected plane, wherein said comparing spatial trajectories comprises measuring one or more deviations, with respect to a set of one or more reference points, between (a) the one or more spatial trajectories associated with the measured hand movements on the given projected plane and (b) one or more gaze saccades within the determined eye gaze path; and
   outputting the computed hand-eye coordination value to at least one user;
   wherein the steps are carried out by at least one computing device.

2. The computer-implemented method of claim 1, wherein the captured video data comprise video data captured by at least one monocular video camera.

3. The computer-implemented method of claim 1, wherein said determining an eye gaze path comprises determining one or more time-stamped gaze patterns of the individual during the given period of time.

4. The computer-implemented method of claim 1, wherein said determining an eye gaze path comprises:
   determining multiple gaze points during the given period of time; and
   creating the eye gaze path based on the multiple gaze points.

5. The computer-implemented method of claim 1, wherein the data derived from one or more wearable sensors comprise motion data.

6. The computer-implemented method of claim 1, wherein the data derived from one or more wearable sensors comprise orientation data.

7. The computer-implemented method of claim 1, wherein the one or more wearable sensors comprises an accelerometer.

8. The computer-implemented method of claim 1, wherein the one or more wearable sensors comprises a gyroscope.

9. The computer-implemented method of claim 1, wherein the one or more wearable sensors comprises a magnetometer.

10. The computer-implemented method of claim 1, wherein the one or more wearable sensors comprise one or more sensors resident on a smart watch worn by the individual.

11. The computer-implemented method of claim 1, wherein said spatio-temporal analysis comprises measuring one or more hand fixation zones and one or more eye fixation zones at one or more related timestamps.

12. The computer-implemented method of claim 1, wherein said comparing temporal values comprises measuring a delay between one or more of the measured hand movements and one or more movements along the determined eye gaze path.

13. A computer program product comprising a computer readable storage medium having program instructions embodied therewith, the program instructions executable by a device to cause the device to:
determine an eye gaze path of an individual during a given period of time, wherein said determining the gaze path comprises measuring, via captured video data, (i) any eye movements made by the individual during the given period of time and (ii) any head movements made by the individual during the given period of time;
measure, via data derived from one or more wearable sensors, any hand movements made by the individual during the given period of time;
perform a spatio-temporal analysis of the determined eye gaze path and the measured hand movements to compute a hand-eye coordination value attributable to the individual, wherein the spatio-temporal analysis comprises:
comparing (i) temporal values associated with movement along the determined eye gaze path and (ii) temporal values associated with the measured hand movement;
defining a given projected plane as an optical projection plane in the three-dimensional space, wherein said defining comprises maintaining one dimension as a constant and varying the other two dimensions; and
comparing (i) one or more spatial trajectories associated with the determined eye gaze path on the given projected plane and (ii) one or more spatial trajectories associated with the measured hand movements on the given projected plane, wherein said comparing spatial trajectories comprises measuring one or more deviations, with respect to a set of one or more reference points, between (a) the one or more spatial trajectories associated with the measured hand movements on the given projected plane and (b) one or more gaze saccades within the determined eye gaze path; and
output the computed hand-eye coordination value to at least one user.

14. The computer program product of claim 13, wherein said determining an eye gaze path comprises determining one or more time-stamped gaze patterns of the individual during the given period of time.

15. The computer program product of claim 13, wherein said determining an eye gaze path comprises:
determining multiple gaze points during the given period of time; and
creating the eye gaze path based on the multiple gaze points.

16. The computer program product of claim 13, wherein said comparing temporal values comprises measuring a delay between one or more of the measured hand movements and one or more movements along the determined eye gaze path.

17. A system comprising:
a memory; and
at least one processor operably coupled to the memory and configured for:
determining an eye gaze path of an individual during a given period of time, wherein said determining the gaze path comprises measuring, via captured video data, (i) any eye movements made by the individual during the given period of time and (ii) any head movements made by the individual during the given period of time;
measuring, via data derived from one or more wearable sensors, any hand movements made by the individual during the given period of time;
performing a spatio-temporal analysis of the determined eye gaze path and the measured hand movements to compute a hand-eye coordination value attributable to the individual, wherein the spatio-temporal analysis comprises:
comparing (i) temporal values associated with movement along the determined eye gaze path and (ii) temporal values associated with the measured hand movement;
defining a given projected plane as an optical projection plane in the three-dimensional space, wherein said defining comprises maintaining one dimension as a constant and varying the other two dimensions; and
comparing (i) one or more spatial trajectories associated with the determined eye gaze path on the given projected plane and (ii) one or more spatial trajectories associated with the measured hand movements on the given projected plane, wherein said comparing spatial trajectories comprises measuring one or more deviations, with respect to a set of one or more reference points, between (a) the one or more spatial trajectories associated with the measured hand movements on the given projected plane and (b) one or more gaze saccades within the determined eye gaze path; and
outputting the computed hand-eye coordination value to at least one user.

18. A computer-implemented method, comprising:
providing, to a user, a task which requires hand-eye coordination by the user;
commencing the task at a first time value and ending the task at a second time value;
determining an eye gaze path of the user during a temporal period that includes the first time value and the second time value, wherein said determining the gaze path comprises measuring, via captured video data, (i) any eye movements made by the user during the temporal period and (ii) any head movements made by the user during the temporal period;

measuring, via data derived from one or more wearable sensors, any hand movements made by the user during the temporal period;

performing a spatio-temporal analysis of the determined eye gaze path and the measured hand movements to compute a hand-eye coordination value for the user, with respect to the task, wherein the spatio-tempora analysis comprises:

comparing (i) temporal values associated with movement along the determined eye gaze path and (ii) temporal values associated with the measured hand movement;

defining a given projected plane as an optical projection plane in the three-dimensional space, wherein said defining comprises maintaining one dimension as a constant and varying the other two dimensions; and comparing (i) one or more spatial trajectories associated with the determined eye gaze path on the given projected plane and (ii) one or more spatial trajectories associated with the measured hand movements on the given projected plane, wherein said comparing spatial trajectories comprises measuring one or more deviations, with respect to a set of one or more reference points, between (a) the one or more spatial trajectories associated with the measured hand movements on the given projected plane and (b) one or more gaze saccades within the determined eye gaze path; and outputting the computed hand-eye coordination value to the user;

wherein the steps are carried out by at least one computing device.

* * * * *